(12) United States Patent
Wians

(10) Patent No.: US 6,464,055 B1
(45) Date of Patent: Oct. 15, 2002

(54) BLADE BRAKE AND CLUTCH

(75) Inventor: Jeffrey A. Wians, Mebane, NC (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/628,447

(22) Filed: Jul. 28, 2000

(51) Int. Cl.$^7$ .............................................. F16D 67/02
(52) U.S. Cl. ........................ 192/18 R; 192/14; 56/11.3
(58) Field of Search .............................. 192/18 R, 66.2, 192/14, 12 R; 56/11.3

(56) References Cited

U.S. PATENT DOCUMENTS

| | | | |
|---|---|---|---|
| 4,141,439 A | 2/1979 | Lunde et al. | |
| 4,205,509 A | 6/1980 | Miyazawa et al. | |
| 4,286,701 A | 9/1981 | MacDonald | |
| 4,322,935 A | 4/1982 | Poehlman | 56/11.3 |
| 4,333,303 A * | 6/1982 | Plamper | 192/18 R X |
| 4,352,266 A | 10/1982 | Lloyd et al. | |
| 4,372,433 A * | 2/1983 | Mitchell et al. | 192/18 R |
| 4,466,233 A | 8/1984 | Thesman | 56/11.3 |
| 4,511,023 A * | 4/1985 | Nagai | 192/18 R |
| 4,513,848 A * | 4/1985 | Lo | 192/103 B |
| 4,524,853 A * | 6/1985 | Nagai | 192/107 R |
| 4,570,766 A * | 2/1986 | Golobay | 192/18 R |
| RE32,202 E | 7/1986 | Cody et al. | 56/11.3 |
| 4,730,710 A * | 3/1988 | Granitz | 192/18 R |
| 5,033,595 A | 7/1991 | Pardee | 192/18 R |
| 5,293,731 A * | 3/1994 | Thomas et al. | 192/18 R |
| 5,549,186 A | 8/1996 | Pardee | 192/18 R |
| 5,581,985 A | 12/1996 | Secosky | 56/10.3 |

* cited by examiner

*Primary Examiner*—Saúl Rodriguez
(74) *Attorney, Agent, or Firm*—Morgan Lewis & Bockius LLP; Mark E. Duell, Esq.

(57) ABSTRACT

A friction coupling includes a friction member including a brake surface and a clutch surface in a different plane from the brake surface; a spring abutting the friction member; a brake member proximate to the brake surface; the brake member mounted relative to the friction member to permit relative rotation; and a brake actuator connected to the brake member.

31 Claims, 5 Drawing Sheets

BLADE BRAKE AND CLUTCH

BACKGROUND OF THE INVENTION

1. Field of the Invention

The present invention relates to power equipment, including but not limited to mowers, tillers, snow blowers, and tractors, and more particularly, to a blade brake and clutch for power equipment.

2. Discussion of Related Art

Conventional power equipment can include a clutch that selectively engages the mower blades with the engine output member. A brake that retards the rotation of the mower blades when the mower blades are disengaged from the engine output member might also be included. The combination of these two coupling devices permits the operator to control the movement of the mower blades independently of the engine output member.

Typically, the components utilized in the clutch are separate and distinct from those employed by the brake. This arrangement creates a large number of parts for assembly as well as for replacement under routine maintenance. This routine maintenance is further hampered by the need to disassemble a relatively large number of parts to replace the worn or broken part(s).

Dimensional constraints are another drawback of conventional blade brake and clutch designs. A large surface area is desirable for both the brake and the clutch. However, packaging space often constricts these areas below their optimum values.

SUMMARY OF THE INVENTION

Accordingly, the present invention is directed to a friction coupling that substantially obviates one or more of the problems due to limitations and disadvantages of the related art.

An object of the present invention is to provide a maximum frictional surface area with a minimum radial dimension for the friction member. This arrangement minimizes the number of parts needed for assembly and maintenance.

Another object of the present invention is to provide a compact assembly that is adequately shielded.

Another object of the present invention is to provide an uncluttered appearance.

Another object of the invention is to minimize the number springs needed to bias the brake and the clutch.

Additional features and advantages of the invention will be set forth in the description which follows, and in part will be apparent from the description and claims hereof as well as the appended drawings.

To achieve these and other advantages and in accordance with the purpose of the present invention, as embodied and broadly described, a friction coupling includes: a friction member including a brake surface and a clutch surface in a different plane from the brake surface; a spring abutting the friction member; a brake member proximate to the brake surface; the brake member mounted relative to the friction member to permit relative rotation; and a brake actuator connected to the brake member.

In another aspect, a drive assembly includes: a driving member; a driven member; a friction member, the friction member including a brake surface and a clutch surface in a different plane from the brake surface; means for rotationally fixing the friction member to one of the drive member and the driven member and for permitting axial displacement of the friction member relative to the driving member and the driven member; a brake member proximate to the brake surface; the brake member mounted relative to the friction member to permit relative rotation; and means for moving the brake member between a first position in which the brake member is engaged with the brake surface and the clutch surface is disengaged with the other one of the driving member and the driven member and a second position in which the brake member is disengaged with the brake surface and the clutch surface is engaged with the other one of the driving member and the driven member; and means for biasing the moving means into the first position.

In a further aspect, a blade brake and clutch assembly for a lawnmower includes: an engine output member; a blade holder; a coupling having a first position and a second position, the coupling including: a friction member including a brake surface and a clutch surface separate from the brake surface, the friction member being connected to one of the engine output member and the blade holder; a first spring located between the friction member and the one of the engine output member and the blade holder; a brake member proximate to the brake surface; the brake member mounted relative to the friction member to permit relative rotation; and a brake actuator connected to the brake member; the clutch surface being disengaged from the other one of the engine output member and the blade holder and the brake member being engaged with the brake surface when the coupling is in the first position and the clutch surface is engaged with the other one of the engine output member and the blade holder and the brake member is disengaged from the brake surface when the coupling is in the second position.

In a further aspect, a drive assembly includes: a driving member; a driven member; a friction member, the friction member including a brake surface and a clutch surface in a different plane from the brake surface; a coupling rotationally fixing the friction member to one of the drive member and the driven member and permitting axial displacement of the friction member relative to the driving member and the driven member; a brake member proximate to the brake surface; the brake member mounted relative to the friction member to permit relative rotation; and a brake actuator connected to the brake member to move the brake member between a first position in which the brake member is engaged with the brake surface and the clutch surface is disengaged with the other one of the driving member and the driven member and a second position in which the brake member is disengaged with the brake surface and the clutch surface is engaged with the other one of the driving member and the driven member; and a first spring biasing the brake member into the first position.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate an embodiment of the invention and together with the description serve to explain the principles of the invention. In the drawings.

DETAILED DESCRIPTION OF THE PREFERRED EMBODIMENTS

Reference will now be made in detail to the preferred embodiments of the present invention, an example of which is illustrated in the accompanying drawings.

Figure 1:
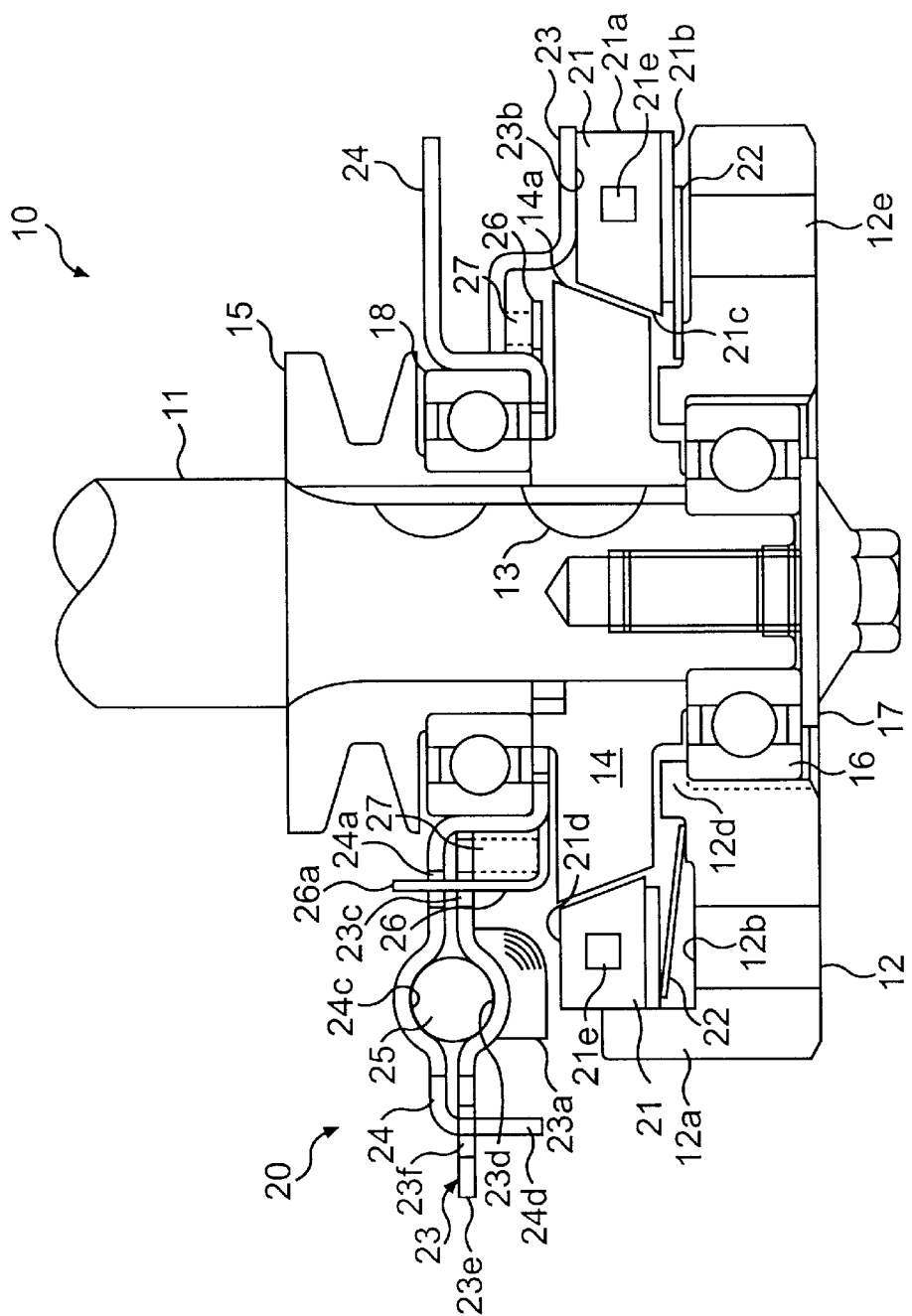
FIG. 1 is a cross-sectional view of a blade brake and clutch.
Figure 2:
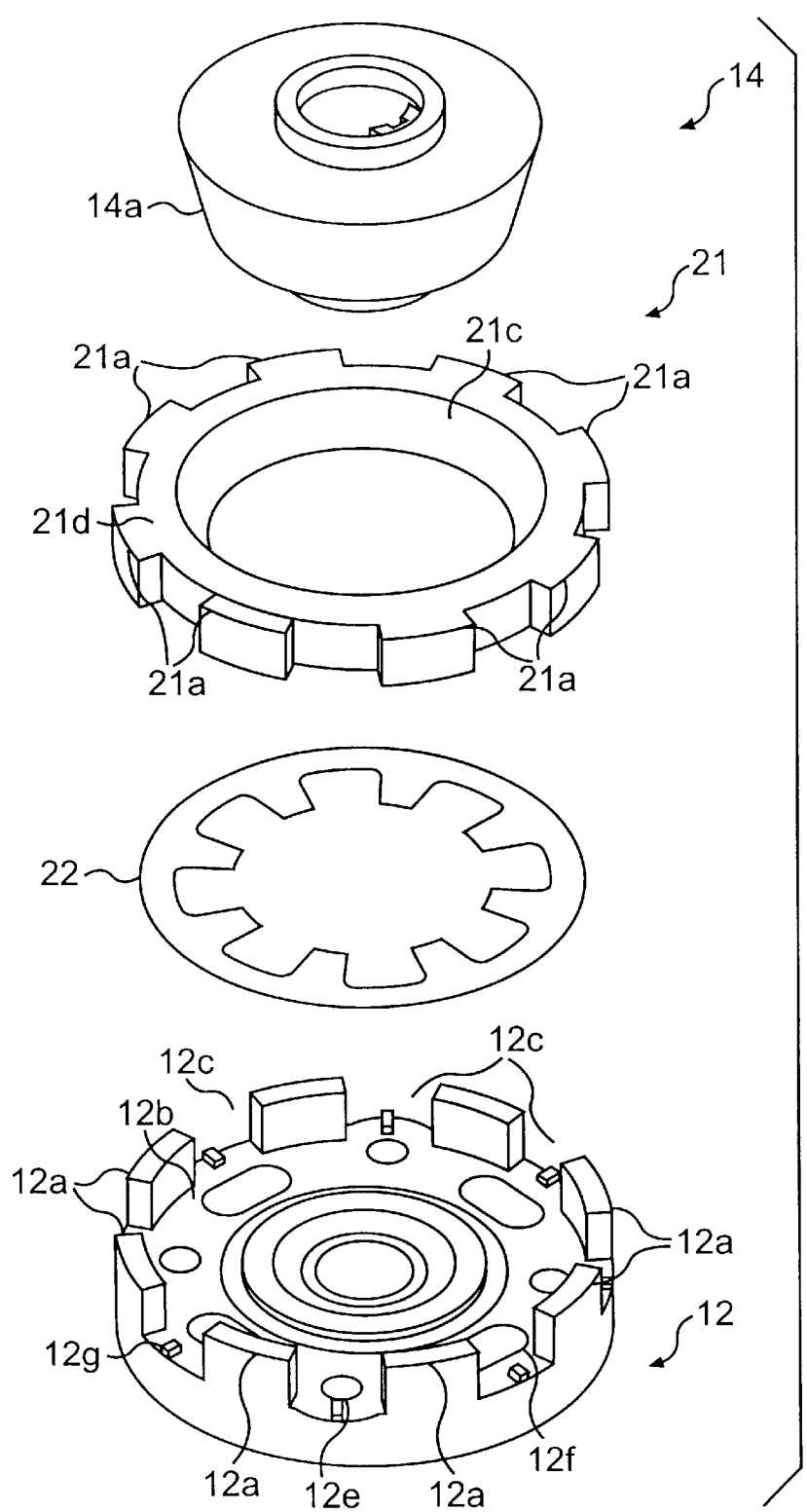
FIG. 2 is an exploded view of a portion of the blade brake and clutch assembly of FIG. 1.
Figure 3:
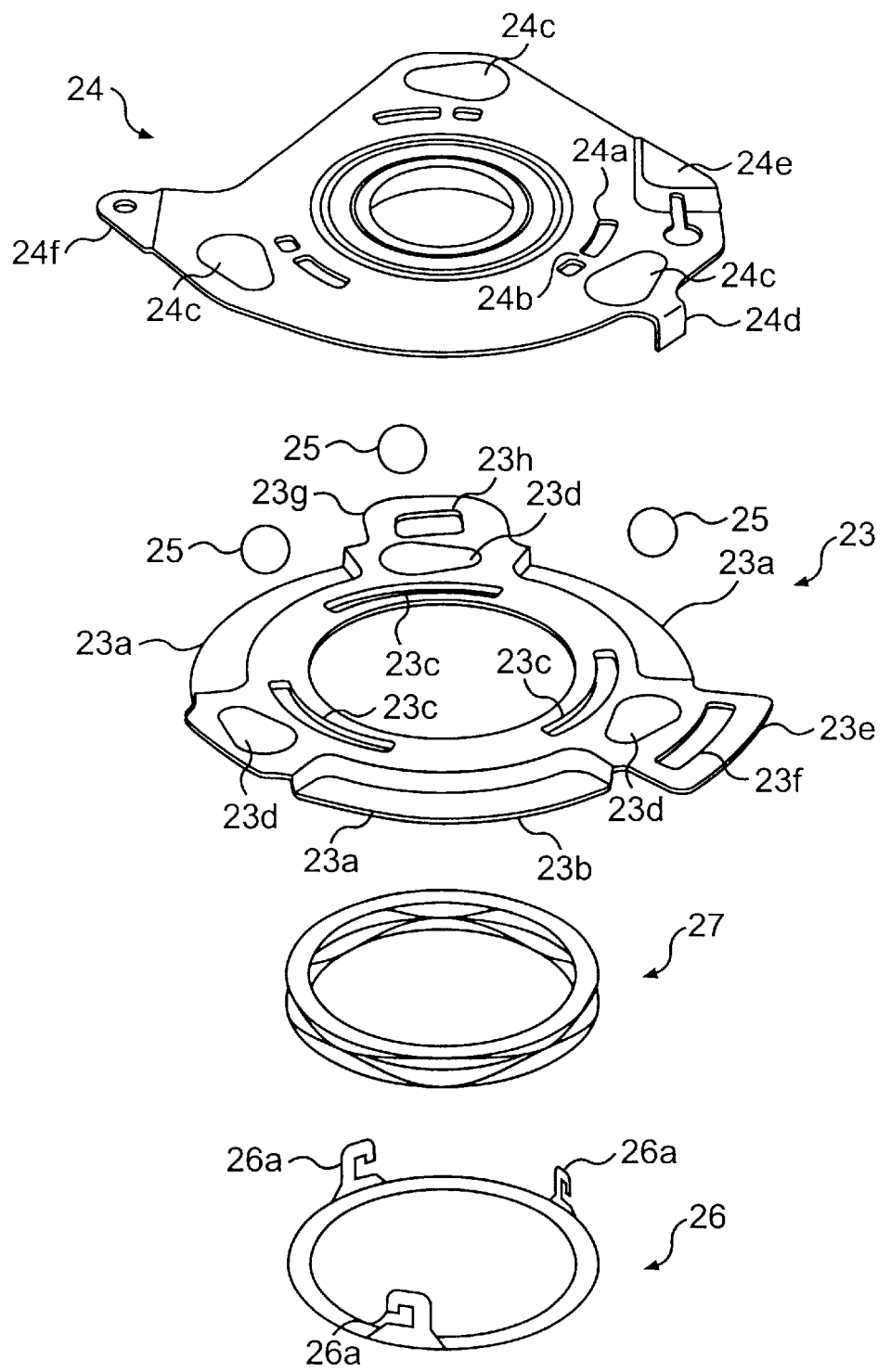
FIG. 3 is an exploded view of another portion of the blade brake and clutch assembly of FIG. 1.

FIGS. 1–3 illustrate a drive assembly 10 including a driving member 11, a driven member 12 and a coupling 20 selectively connecting the driving member 11 to the driven member 12. The driving member 11 can be a shaft connected to a lawn mower engine (not shown). The driven member 12 can be a blade holder adapted to carry a mower blade (not shown).

A key 13 fixes a drive hub 14 to the driving member 11 in a conventional manner. A power take-off pulley 15 is connected to the driving member 11 in a conventional manner. A bearing assembly 16 mounts the driven member 12 on the driving member 11. The bearing is axially restrained on the driving member 11 between a flanged bolt 17 secured to the driving member 11 and the drive hub 14. The bearing assembly 16 permits the driving member 11 to rotate relative to the driven member 12, as will be discussed later.

Alternatively, the drive hub 14 and the power take-off pulley 15 can be secured to the driving member 11 by other mechanical connections such as a built-in key, a tongue and groove, splines or a snap ring. The drive hub 14 and the power take-off pulley 15 can also be integrally formed with the driving member 11. The bearing assembly 16 can be secured by a press-fit or staking it to either one or both of the driving member 11 and the driven member 12 or other similar means can be used.

The driven member 12 is annular and has a plurality of projections 12a spaced along its circumference. These projections 12a extend axially from an upper face 12b of the driven member 12. Axial projections 12a adjacent one another define a space 12c between them. The driven member 12 is axially located on the bearing 16 by an annular flange 12d. Alternatively, a washer or other similar means can locate the driven member 12 on the bearing 16. A plurality of threaded holes 12e are circumferentially spaced about the driven member. An implement, such as a blade (not shown), can be secured to the driven member 12 via bolts (not shown) inserted in the threaded holes 12e. A plurality of through holes 12f (FIG. 2) can be provided in the driven member 12 to facilitate removal of any debris, such as grass clippings and dirt. A stopper 12g (FIG. 2) can be provided on the upper surface 12b of the driven member 12 in at least one of the spaces 12c. This stopper 12g may be configured as a rib or other suitable shape.

The coupling 20 includes a friction member 21, a Belleville spring 22, a brake member 23, a brake actuator 24, a plurality of balls 25, a retainer 26 and a compression spring 27. The compression spring 27 is configured to be compressible to a very small axial thickness. Only one compression spring 27 is necessary in the preferred embodiment of the coupling 20. This permits a compact assembly and minimizes the number of parts.

The coupling 20 is configured to simultaneously displace the brake member 23 and the friction member 21 between respective engaged and disengaged positions, as will be discussed in more detail. It is noted that the right half of FIG. 1 represents the coupling 20 in a first configuration and the left half of FIG. 1 represents the coupling 20 in a second configuration.

The friction member 21 has a plurality of radially extending projections 21a spaced along its circumference. Each radial projection 21a extends into a corresponding one of the spaces 12c and abuts the two adjacent axial projections 12a. The axial projections 12a and the radial projections 21a rotationally secure the friction member 21 to the driven member 12. The friction member 21 is a one-piece element which can be a composite including rubber, brass and graphite.

In the preferred embodiment, the friction member 21 has a powder metal core 21e for reinforcement. The powder metal core 21e can be provided with surface ridges to rotationally lock the powder metal core 21e within the friction member 21. While the powder metal core 21e adds strength to the friction member 21, the friction member 21 can function without it.

The Belleville spring 22 contacts both the upper face 12b of the driven member 12 and a lower surface 21b of the friction member 21. This spring 22 biases the friction member 21 axially away from the driven member 12. The interaction of the axial projections 12a and the radial projections 21a permits the friction member 21 to be axially displaced relative to the driven member 12.

A clutch surface 21c formed on the inner circumference of a friction member 21 selectively engages a frusto-conical outer surface 14a on the drive hub 14. The clutch surface 21c is frusto-conical. Forming this clutch surface 21c as a frusto-conical surface maximizes surface area with a minimum radial dimension.

The spring 22 biases the clutch surface 21c into contact with the frusto-conical outer surface 14a of the drive hub 14. This frictional contact allows the drive hub 14 to drive the driven member 12.

A brake surface 21d is provided on the upper surface of the friction member 21. The brake surface 21d and the clutch surface 21c are provided on separate (the upper and the inside) surfaces of the friction member 21 to save space and minimize the number of elements needed for the coupling 20.

The brake member 23 has at least one brake shoe 23a, and preferably, a plurality of brake shoes 23a circumferentially spaced about its periphery. The brake shoes 23a extend axially downward from the bottom of the brake member 23. Each brake shoe 23a has a braking surface 23b that selectively engages the brake surface 21d on the friction member 21.

The brake actuator 24 is coaxially disposed above the brake member 23. A bearing assembly 18 allows the brake actuator 24 to be mounted for relative rotation on driving member 11 via the power take-off pulley 15. The bearing assembly 18 is press fit onto the power take-off pulley 15 and the brake actuator 24. Alternatively, the bearing assembly 18 can be retained by staking the bearing assembly 18 to any combination of the power take-off pulley 15, the brake actuator 24 and the drive hub 14.

The brake actuator 24 has a plurality of circumferentially spaced arcuate slots 24a. A rib 24b extends across a respective one of the arcuate slots 24a; see FIGS. 3 and 4.

A plurality of arcuate slots 23c are circumferentially spaced on the brake member 23. A portion of each brake member arcuate slot 23c overlaps a corresponding brake actuator arcuate slot 24a with the remainder extending beyond the corresponding brake actuator arcuate slot 24a.

The retainer 26 is a flat annular disk with a plurality of hooks 26a extending axially upward from the circumference of the retainer 26. The retainer 26 is coaxially disposed below the brake actuator 24 and radially inside of the brake shoes 23a. Each hook 26a projects through the arcuate slots 23c and 24b in the brake member 23 and the brake actuator 24. Each hook 26a is secured on a respective rib 24b.

In the preferred embodiment, the retainer 26 is coated with a low friction material, such as polytetraflouroethylene (PTFE) or nylon. This low friction coating allows for an easier return of the retainer 26 to its neutral position, as will be discussed later.

The compression spring 27 is captured between the bottom of the brake member 23 and the upper surface of retainer 26. The retainer 26 connects the brake member 23 to the brake actuator 24, and compression the spring 27 biases the brake member 23 away from the brake actuator 24.

A plurality of ball ramp assemblies form a connection between the brake member 23 and the brake actuator 24. Each ball ramp assembly comprises inclined ball ramp surfaces 23d, 24c formed in each of the brake member 23 and the brake actuator 24. The ball ramp surfaces 23d oppose the ball ramp surfaces 24c and are inclined in the opposite direction relative to the ball ramp surfaces 24c. A ball 25 is movably captured between each pair of opposed ball ramp surfaces 23d, 24c.

Figure 4:
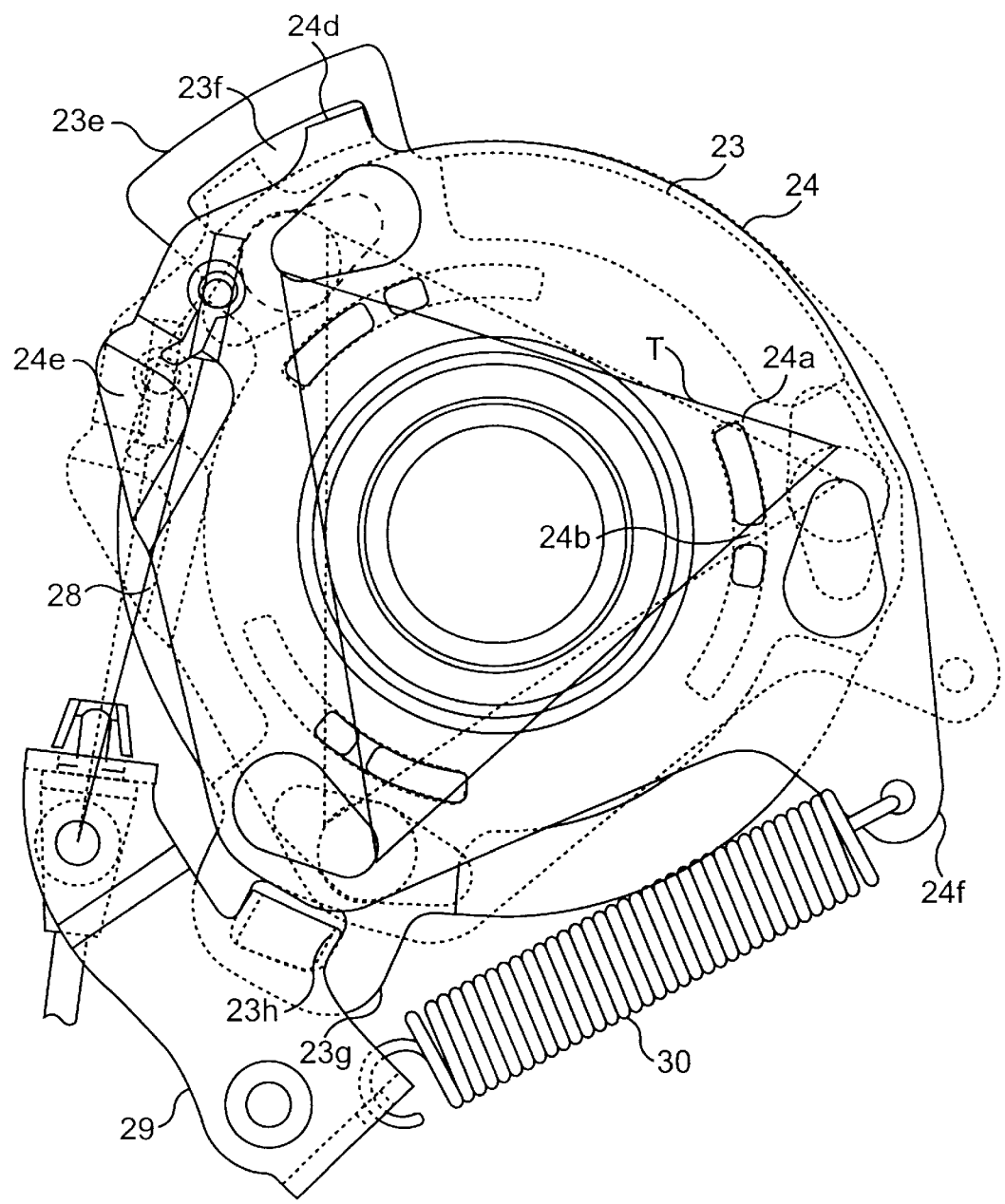
FIG. 4 is a plan view of the blade brake and clutch of FIG. 1.

Three ball ramp surface pairs may be used and located on the brake member 23 and brake actuator 24 at points of a triangle T; see FIG. 4. This triangle T is preferably an equilateral triangle but any other triangle may be used. The hooks 26a of retainer 26 are located within the perimeter of the triangle T and proximate a respective corner. This arrangement positions the hooks 26a close to the ball ramp surfaces 23d, 24c. With this arrangement, the force from the compression spring 27 is located within the triangle T. This enhances the performance of the coupling 20. However, the hooks 26a can be located in other positions.

A tab 23e extends radially from the circumference of the brake member 23. An arcuate tab slot 23f is formed in the tab 23e. The brake actuator 24 has a projection 24d that extends axially downward through the tab slot 23f. The width of the projection 24d is less than the arcuate length of the tab slot 23f.

Alternatively, other couplings that convert rotary motion to axial motion can be used instead of the ball ramp surface assembly, such as a cam and follower assembly. Other embodiments can forgo any rotary motion of the brake actuator such as a linkage system that provides a linearly displaceable link in contact with the brake member.

Figure 5:
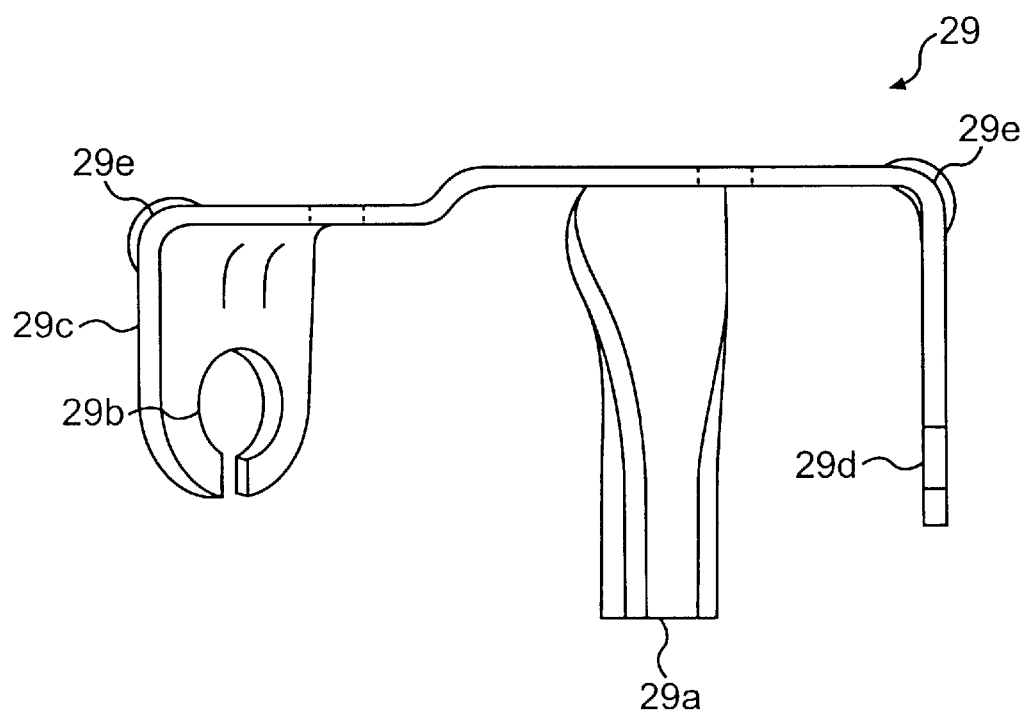
FIG. 5 is a side view of a bracket used with the blade brake and clutch of FIG. 1.

Referring to FIGS. 4 and 5, a bracket 29 is secured to a bracket tab 23g on the brake member 23 by a post 29a. The post 29a extends axially downward through an opening 23h in the bracket tab 23g. The brake member 23 is free to move axially along the post 29a. The bracket 29 can be secured to a mounting surface, such as a mower deck or an engine block, by bolts or other suitable fastening arrangement. Thus, the bracket 29 rotationally fixes the brake member 23. Alternatively, the brake member 23 can be rotationally secured by a bolt or other similar fastening arrangement.

The bracket 29 includes a hole 29b formed in a guide flange 29c. A projection 24e extends axially upward from the top surface of the brake actuator 24. One end of a control cable 28 passes through the hole 29b in the guide flange 29c and is secured to the 24e projection by way of a slot or a hole or any other similar manner. The other end of the control cable 28 is secured to a control handle (not shown). Alternatively, the control cable 28 can be secured at one end to a hole in the brake actuator 24.

A coil spring 30 is secured at one end to the bracket 29 at a recess 29d. The other end of the coil spring 30 is secured to a spring tab 24f formed at the periphery of the brake actuator 24. The recess 29d could be placed by a hole in an alternate embodiment.

The bracket 29 can include a plurality of ribs 29e to assist in the support the guide flange 29c and the flange containing the recess 29d. However, the bracket 29 does not need to be provided with these ribs 29e.

The bracket 29 is a single element providing the functions of rotationally fixing the brake member 23, anchoring the control cable 28 and anchoring the coil spring 30. The preferred embodiment of the bracket 29, therefore, contributes to the reduction of parts for assembly.

Operation of the brake and clutch of the invention will now be described with reference to FIGS. 1 and 4.

Actuation of the control cable 28 imparts a rotary motion to the brake actuator 24. This, in turn, causes each ball ramp surface 24c to move relative to the associated ball 25. The ball 25 rolls along the oppositely inclined ball ramp surface 23d. This motion of the ball forces the brake member 23 axially downward against the bias of the compression spring 27 to engage the braking surface 23b with the brake surface 21d. Further rotation of the brake actuator 24 by displacement of the control cable 28 causes the braking surface 23b to axially displace the friction member 21 axially downward toward the driven member 12 against the bias of the Belleville spring 22. This downward movement of the friction member 21 gradually disengages the clutch surface 21c from the frusto-conical surface 14a of the drive hub. This motion eventually completely disengages the driven member 12 from the driving member 11 and retards the rotation of the driven member 12. At this point, the stopper 12g is engaged by the bottom surface 21b of the friction member. This configuration is illustrated in the right half of FIG. 1.

Actuation of the control cable 28 in the opposite direction rotates the brake actuator 24 in the opposite direction, which, in turn, displaces the brake member 23 upward from the friction member 21. This motion gradually disengages the braking surface 23b from the brake surface 21d of the friction member 21. Simultaneously, the clutch surface 21c is gradually brought into engagement with the frusto-conical surface 14a due to the bias of the Belleville spring 22. This motion eventually completely engages the driven member 12 with the driving member 11 and completely disengages the braking surface 23b from the brake surface 21d. This configuration is illustrated in the left half of FIG. 1.

Rotation of the brake actuator 24 relative to the brake member 23 is limited by the interaction of the tab slot 24d with tab slot 23f. One end of the tab slot 23f defines a first limit of the brake actuator 24 and the other end of the tab slot 23f defines a second limit of the brake actuator. When the brake actuator is in the first limit position, the clutch surface 21c is disengaged from the frusto-conical surface 14a and the braking surface 23b is engaged with the brake surface 21d. When the brake actuator is in the second limit position, the clutch surface 21c is engaged with the frusto-conical surface 14a and the braking surface 23b is disengaged from the brake surface 21d.

The force exerted by the coil spring 30 is directed on the brake actuator in such a manner as to overcome the bias of both of the compression spring 27 and the Belleville spring 22. Thus, the coil spring 30 biases the brake actuator 24 towards the first limit position. This ensures that the driven member 12 is disengaged from the driving member 11 and that the brake member 23 holds the driven member against rotation until an operator provides input to the brake actuator 24.

Other embodiments of the various elements described herein can be utilized in accordance with the present invention. For example, the brake surface 21d could be formed on the lower radial face of the friction member 21. Another embodiment of the friction member 21 could locate the brake surface 21d on the outer circumference of the friction as a frusto-conical and the clutch surface 21c could be formed on either radial face of the friction member 21. The location of the brake member 23 and the brake actuator 24 can be on either side of the friction member 21 so long as the Belleville spring 22 is on the opposite side of the friction member 21. The friction member 21 alternatively could be secured to the driving member 11 in any of the configurations described above. The control cable 28 can be replaced by a rigid link secured at one end to the brake actuator 24 and connected at the other end to the control handle by a linkage.

It will be apparent to those skilled in the art that various modifications and variations can be made in the friction coupling of the present invention without departing from the spirit or scope of the invention. Thus, it is intended that the present invention covers the modifications and variations of this invention provided they come within the scope of the appended claims and their equivalents.

What is claimed is:

1. A friction coupling comprising:
    a friction member including an integral brake surface and an integral clutch surface in a different plane from the brake surface and abutting the brake surface;
    a spring abutting the friction member;
    a brake member proximate to the brake surface; the brake member mounted relative to the friction member to permit relative rotation; and
    a brake actuator connected to the brake member.

2. The friction coupling of claim 1 wherein the friction member is a one-piece member.

3. The friction coupling of claim 2 wherein the clutch surface is inclined relative to the brake surface.

4. The friction coupling of claim 1 wherein the friction member is an annular disk having a axial surface and an inner circumferential surface, the brake surface being located on the axial surface and the clutch surface being on the inner circumferential surface.

5. The friction coupling of claim 4 wherein the inner circumferential surface of the annular disk is a frusto-conical surface.

6. The friction coupling of claim 1 wherein the friction member has circumferentially spaced radial projections.

7. The friction coupling of claim 1 further comprising:
    at least one ball ramp assembly connecting the brake actuator to the brake member; and
    a spring between the brake actuator and the brake member.

8. The friction coupling of claim 7 further comprising:
    an abutment on one of the brake member and the brake actuator; and
    a stop on the other of the brake member and the brake actuator.

9. The friction coupling of claim 8 wherein the abutment is a finger extending from the brake actuator and the stop is a slot formed in the brake member wherein the finger extends into the slot.

10. The friction coupling of claim 1 wherein the clutch surface is a frusto-conical surface.

11. The friction coupling of claim 10 wherein each of the at least ball ramp assemblies comprises:
    an inclined ball ramp surface on each of the brake member and the brake actuator, each of the ball ramp surfaces on the brake member opposes and is inclined opposite to a corresponding one of the ball ramp surfaces on the brake actuator; and
    a ball between and in contact with each of the opposing ball ramp surfaces.

12. The friction coupling of claim 1 wherein the brake actuator is in contact with the brake member at three points defining a triangle; and further comprising:
    a retainer connected to the brake actuator by at least one point lying within the perimeter of the triangle.

13. The friction coupling of claim 12 wherein the triangle is an equilateral triangle.

14. The friction coupling of claim 12 wherein the retainer has a low friction coating.

15. The friction coupling of claim 1 further comprising:
    a bracket secured to the brake member, the bracket including a guide member;
    a spring connected at one end to the brake actuator and at a second end to the bracket;
    a flange formed on the brake actuator; and
    a link extending through the guide member and connected to the flange.

16. A drive assembly comprising:
    a driving member;
    a driven member;
    a friction member, the friction member including a brake surface and a clutch surface in a different plane from the brake surface and abutting the brake surface;
    means for rotationally fixing the friction member to one of the drive member and the driven member and for permitting axial displacement of the friction member relative to the driving member and the driven member;
    a brake member proximate to the brake surface; the brake member mounted relative to the friction member to permit relative rotation; and
    means for moving the brake member between a first position in which the brake member is engaged with the brake surface and the clutch surface is disengaged with the other one of the driving member and the driven member and a second position in which the brake member is disengaged with the brake surface and the clutch surface is engaged with the other one of the driving member and the driven member; and
    means for biasing the moving means into the first position.

17. The drive assembly of claim 16 wherein each of the driving member and the driven member has an axis, the driven member is coaxial with the driving member and the first position is axially displaced relative to the second position.

18. The drive assembly at claim 17 wherein the moving means comprises:
    a brake actuator;
    means for angularly displacing the brake actuator relative to the brake member;

means for axially displacing the brake member relative between the first position and the second position in response to angular displacement of the brake actuator; and means for biasing the clutch surface into engagement with the other one of the driving member and the driven member when the moving means places the brake member into the second position.

19. A blade brake and clutch assembly for a lawnmower comprising:

an engine output member;

a blade holder;

a coupling having a first position and a second position, the coupling comprising:
   a friction member including an integral brake surface and an integral clutch surface separate from the brake surface and abutting the brake surface, the friction member being connected to one of the engine output member and the blade holder;
   a first spring located between the friction member and the one of the engine output member and the blade holder;
   a brake member proximate to the brake surface; the brake member mounted relative to the friction member to permit relative rotation; and
   a brake actuator connected to the brake member;
   the clutch surface being disengaged from the other one of the engine output member and the blade holder and the brake member being engaged with the brake surface when the coupling is in the first position and the clutch surface is engaged with the other one of the engine output member and the blade holder and the brake member is disengaged from the brake surface when the coupling is in the second position.

20. The blade brake and clutch assembly of claim 19 wherein the coupling further comprises:
   a retainer connected to the brake actuator, the brake member extending between the retainer and the brake actuator; and
   a second spring between the retainer and the brake member.

21. The blade brake and clutch assembly of claim 20 wherein the retainer has as low friction coating.

22. The blade brake and clutch assembly of claim 21 wherein the low friction coating includes polytetraflouroethylene.

23. The blade and clutch assembly of claim 21 wherein the low friction coating includes nylon.

24. The blade brake and clutch assembly of claim 20 wherein the coupling further comprises:
   at least one pair of opposed ball ramp surfaces; one of each the pair of ball ramp surfaces formed in the brake member and another one of each of the pair of ball ramp surfaces formed in the brake actuator and inclined in the opposite direction of the opposed brake member ball ramp surface;
   a ball interposed in each pair of the ball ramp surfaces;
   a finger extending from the brake actuator; and
   a slot formed in the brake member, wherein the finger extends into the slot.

25. The blade brake and clutch assembly of claim 19 wherein the coupling further comprises:
   a bracket secured to the brake member, the bracket including a guide member;
   a third spring connected at one end to the brake actuator and at another end to the bracket;
   a flange formed on the brake actuator; and
   a cable extending through the guide member and secured to the flange.

26. The blade brake and clutch assembly of claim 19 wherein:
   the one of the engine output member and the blade holder includes a plurality circumferentially spaced axial projections; and
   the friction member includes a plurality of circumferentially spaced radial projections, each of the radial projections extending between a respective pair of the axial projections.

27. The blade brake and clutch assembly of claim 26 wherein the plurality of circumferentially spaced axial projections are on the blade holder and the friction member is connected to the blade holder.

28. A drive assembly comprising:
   a driving member;
   a driven member;
   a friction member, the friction member including a brake surface and a clutch surface in a different plane from the brake surface and abutting the brake surface;
   a coupling rotationally fixing the friction member to one of the drive member and the driven member and permitting axial displacement of the friction member relative to the driving member and the driven member;
   a brake member proximate to the brake surface; the brake member mounted relative to the friction member to permit relative rotation; and
   a brake actuator connected to the brake member to move the brake member between a first position in which the brake member is engaged with the brake surface and the clutch surface is disengaged with the other one of the driving member and the driven member and a second position in which the brake member is disengaged with the brake surface and the clutch surface is engaged with the other one of the driving member and the driven member; and
   a first spring biasing the brake member into the first position.

29. The drive assembly of claim 28 wherein the brake actuator is connected to the brake member by at least one ball ramp assembly, each of the at least one ball ramp assembly including:
   an inclined ball ramp surface on each of the brake member and the brake actuator, each of the ball ramp surfaces on the brake member opposes and is inclined opposite to a corresponding one of the ball ramp surfaces on the brake actuator; and
   a ball between and in contact with each of the ball ramp surfaces; and further comprising:
      a second spring biasing the brake member into the second position.

30. A drive assembly comprising:
   a driving member;
   a driven member;
   a friction member, the friction member including a brake surface and a clutch surface in a different plane from the brake surface and abutting the brake surface;
   means for rotationally fixing the friction member to one of the drive member and the driven member and for permitting axial displacement of the friction member relative to the driving member and the driven member;
   a brake member proximate to the brake surface; the brake member mounted relative to the friction member to permit relative rotation; and means for moving the brake member between a first position in which the brake member is engaged with the brake surface and the clutch surface is disengaged with the other one of the driving member and the driven member and a second position in which the brake member is disengaged with the brake surface and the clutch surface is engaged with the other one of the driving member and the driven member; and means for biasing the moving means into the first position;

each of the driving member and the driven member has an axis, the driven member is coaxial with the driving member and the first position is axially displaced relative to the second position, and the moving means includes:
  a brake actuator;
  means for angularly displacing the brake actuator relative to the brake member;
  means for axially displacing the brake member relative between the first position and the second position in response to angular displacement of the brake actuator; and
  means for biasing the clutch surface into engagement with the other one of the driving member and the driven member when the moving means places the brake member into the second position.

31. A drive assembly comprising:

a driving member;

a driven member;

a friction member, the friction member including a brake surface and a clutch surface in a different plane from the brake surface and abutting the brake surface;

a coupling rotationally fixing the friction member to one of the drive member and the driven member and permitting axial displacement of the friction member relative to the driving member and the driven member;

a brake member proximate to the brake surface; the brake member mounted relative to the friction member to permit relative rotation; and a brake actuator connected to the brake member to move the brake member between a first position in which the brake member is engaged with the brake surface and the clutch surface is disengaged with the other one of the driving member and the driven member and a second position in which the brake member is disengaged with the brake surface and the clutch surface is engaged with the other one of the driving member and the driven member; and a first spring biasing the brake member into the first position;

the brake actuator is connected to the brake member by at least one ball ramp assembly, each of the at least one ball ramp assembly including:
  an inclined ball ramp surface on each of the brake member and the brake actuator, each of the ball ramp surfaces on the brake member opposes and is inclined opposite to a corresponding one of the ball ramp surfaces on the brake actuator; and
  a ball between and in contact with each of the ball ramp surfaces; and further including:
    a second spring biasing the brake member into the second position.

* * * * *